United States Patent
Matsumoto

(10) Patent No.: US 12,333,938 B2
(45) Date of Patent: Jun. 17, 2025

(54) INFORMATION PROCESSING DEVICE

(71) Applicant: TOYOTA JIDOSHA KABUSHIKI KAISHA, Toyota (JP)

(72) Inventor: Kazuki Matsumoto, Ogaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 93 days.

(21) Appl. No.: 18/484,751

(22) Filed: Oct. 11, 2023

(65) Prior Publication Data
US 2024/0242607 A1    Jul. 18, 2024

(30) Foreign Application Priority Data

Jan. 17, 2023 (JP) ................................. 2023-005201

(51) Int. Cl.
| | |
|---|---|
| G08G 1/14 | (2006.01) |
| B60R 25/40 | (2013.01) |
| G06Q 10/02 | (2012.01) |
| G06V 20/58 | (2022.01) |

(52) U.S. Cl.
CPC ............. *G08G 1/14* (2013.01); *B60R 25/403* (2013.01); *G06Q 10/02* (2013.01); *G06V 20/586* (2022.01); *B60R 2325/205* (2013.01)

(58) Field of Classification Search
CPC .. G08G 1/14; B60R 25/403; B60R 2325/205; G06Q 10/02; G06V 20/586; B60L 53/00
See application file for complete search history.

(56) References Cited

U.S. PATENT DOCUMENTS

| | | | |
|---|---|---|---|
| 8,692,688 B1* | 4/2014 | Tuxen .................... | B60Q 9/002 340/425.5 |
| 9,014,914 B2* | 4/2015 | Beaurepaire ........... | G08G 1/142 455/414.1 |
| 10,832,574 B1* | 11/2020 | Agarwal ................. | G08G 1/144 |
| 2017/0138746 A1* | 5/2017 | Eliassi ................ | G01C 21/3476 |
| 2017/0166115 A1* | 6/2017 | Pal .......................... | B60Q 5/005 |
| 2017/0191849 A1* | 7/2017 | Agam ..................... | G08G 1/148 |
| 2017/0316690 A1* | 11/2017 | Charles .................. | H04W 4/023 |
| 2018/0162384 A1* | 6/2018 | Kim ....................... | B60W 30/06 |
| 2022/0332210 A1* | 10/2022 | Goei ........................ | B60L 53/53 |
| 2022/0415173 A1* | 12/2022 | Agarwal ............. | G01C 21/3415 |

FOREIGN PATENT DOCUMENTS

| | | |
|---|---|---|
| JP | 2013-192285 A | 9/2013 |
| JP | 2021-167759 A | 10/2021 |

\* cited by examiner

*Primary Examiner* — Nay Tun
(74) *Attorney, Agent, or Firm* — SoraIP, Inc.

(57) ABSTRACT

In the information processing device according to the present disclosure, the control unit receives a first request requesting information on a second vehicle having a power supply function from a first terminal corresponding to the first vehicle. The control unit acquires the parked location of the second vehicle and the first information on the surroundings of the second vehicle, triggered by the reception of the first information. The control unit determines whether there is a parking space around the second vehicle based on the parked location of the second vehicle or the first information. When it is determined that there is a parking space around the second vehicle, the control unit sends second information including the parked location of the second vehicle to the first terminal.

4 Claims, 5 Drawing Sheets

FIG. 4

| VEHICLE ID | APPEARANCE | STATUS | LOCATION | RESERVATION |
|---|---|---|---|---|
| V0001 | ----- | PARKED | ----- | NO |
| V0002 | ----- | PARKED | ----- | YES |
| V0003 | ----- | TRAVELING | ----- | N/A |
| ⋮ | ⋮ | ⋮ | ⋮ | ⋮ |

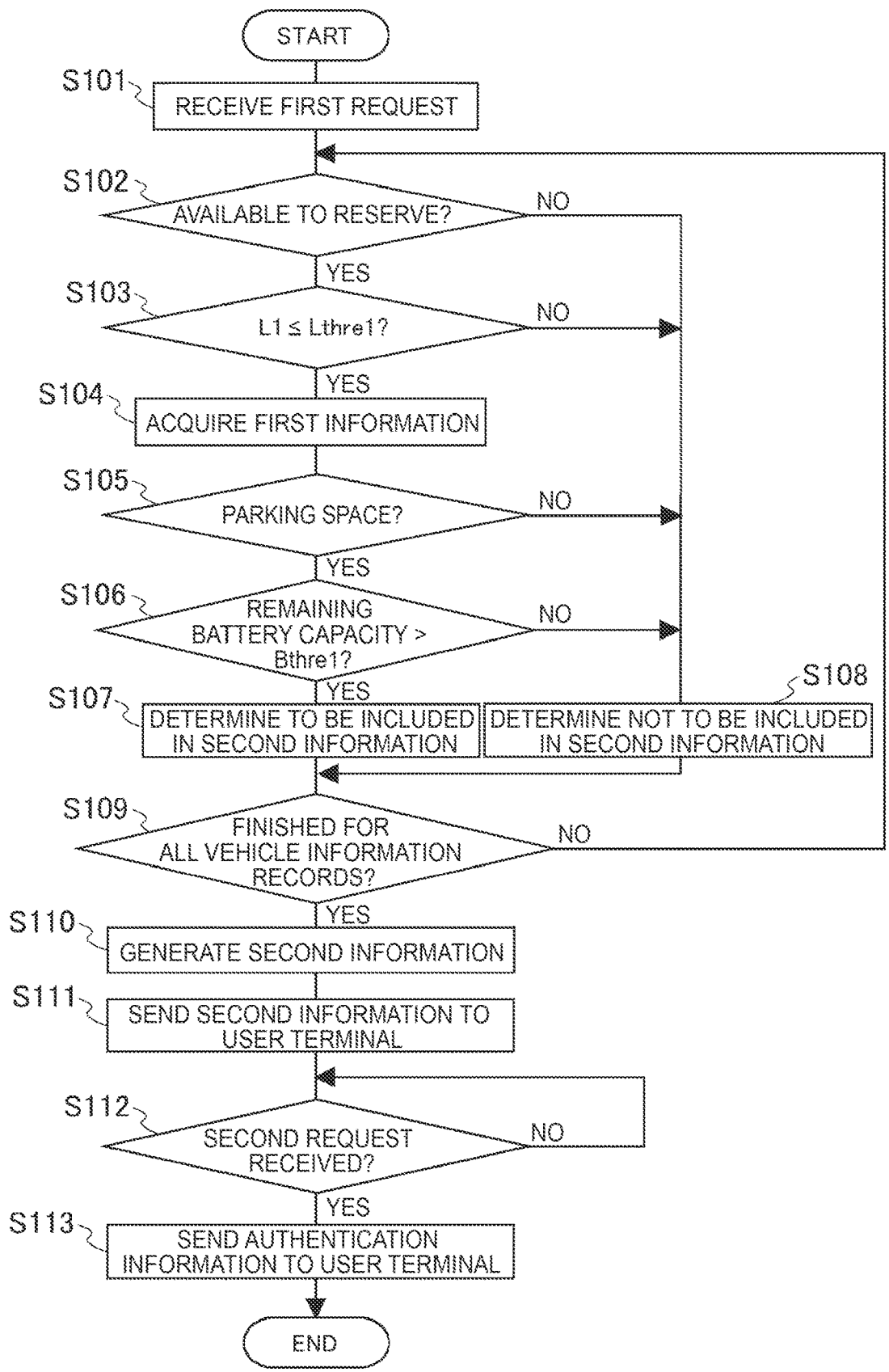

INFORMATION PROCESSING DEVICE

CROSS-REFERENCE TO RELATED APPLICATION

This application claims priority to Japanese Patent Application No. 2023-005201 filed on Jan. 17, 2023, incorporated herein by reference in its entirety.

BACKGROUND

1. Technical Field

The present disclosure relates to information processing devices.

2. Description of Related Art

Japanese Unexamined Patent Application Publication No. 2021-167759 (JP 2021-167759 A) discloses a configuration that acquires the current locations of a plurality of vehicles, searches for a recommended place for energy transfer between the vehicles based on the current locations of the vehicles, and provides information on the found recommended place for energy transfer to the vehicles. Japanese Unexamined Patent Application Publication No. 2013-192285 (JP 2013-192285 A) discloses a configuration that causes a vehicle to send a power supply request signal requesting power supply to a traction battery of the vehicle and including the current location of the vehicle to other vehicles around the vehicle by vehicle-to-vehicle communication.

SUMMARY

It is an object of the present disclosure to provide a technique capable of improving convenience for users who want to charge their vehicles.

The present disclosure can be regarded as an information processing device. In that case, the information processing device may include, for example, a control device configured to receive a first request sent from a first terminal corresponding to a first vehicle, the first request being a request for information on a second vehicle having a power supply function, acquire a parked location of the second vehicle and first information on surroundings of the second vehicle, and send second information including the parked location to the first terminal when the control unit determines based on either or both of the parked location and the first information that there is a parking space around the second vehicle.

The present disclosure can also be regarded as an information processing method in which a computer performs a process of the above information processing device. The present disclosure can also be regarded as an information processing program that causes a computer to perform the above information processing method, or a non-transitory storage medium storing the information processing program.

According to the present disclosure, it is possible to provide a technique capable of improving convenience for users who want to charge their vehicles.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a diagram showing an example of information stored in a vehicle management DB in the embodiment; and FIG. 5 is a flowchart showing a processing routine executed by the server in the embodiment.

DETAILED DESCRIPTION OF EMBODIMENTS

In an information processing device according to the present disclosure, a control unit receives a first request sent from a first terminal. The first terminal is, for example, a mobile terminal (e.g., smart phone, tablet, etc.) used by the user of the first vehicle. The first vehicle is, for example, a Plug-in Hybrid Electric Vehicle (PHEV), a Battery Electric Vehicle (BEV), or the like. The first request is a signal requesting information on a second vehicle. The second vehicle is, for example, a PHEV or BEV having a power supply function. The information processing device is, for example, a server etc. that communicates with the first terminal and the second vehicle via a network.

The control unit acquires the parked location of the second vehicle and information (first information) on the surroundings of the second vehicle in response to the first request. The first information is, for example, image data captured by a camera mounted on the second vehicle. The control unit determines whether there is a parking space around the second vehicle based on the acquired parked location and/or the first information. The parking space around the second vehicle is, for example, a parking space within the length of a power transmission cable used when power is supplied from the second vehicle to another vehicle.

When it is determined that there is a parking space around the second vehicle, the control unit sends second information including the parked location of the second vehicle to the first terminal. Thereby, the user of the first vehicle can grasp the parked location of the second vehicle that has a parking space around it through the first terminal. As a result, the user of the first vehicle can park the first vehicle in the parking space around the second vehicle and charge the battery of the first vehicle with the second vehicle. It is also possible to reduce the possibility that the user of the first vehicle may move the first vehicle to the parked location of the second vehicle that has no parking space around it. Therefore, it is possible to improve convenience for the user who wishes to charge the battery of the first vehicle.

Hereinafter, an embodiment of the present disclosure will be described with reference to the drawings. The hardware configuration, module configuration, functional configuration, and the like described in the following embodiments are not intended to limit the technical scope of the disclosure unless otherwise specified.

Embodiment

In this embodiment, an example in which the information processing device according to the present disclosure is applied to a system for providing information on vehicles having a power supply function will be described.

Summary of System

Figure 1:
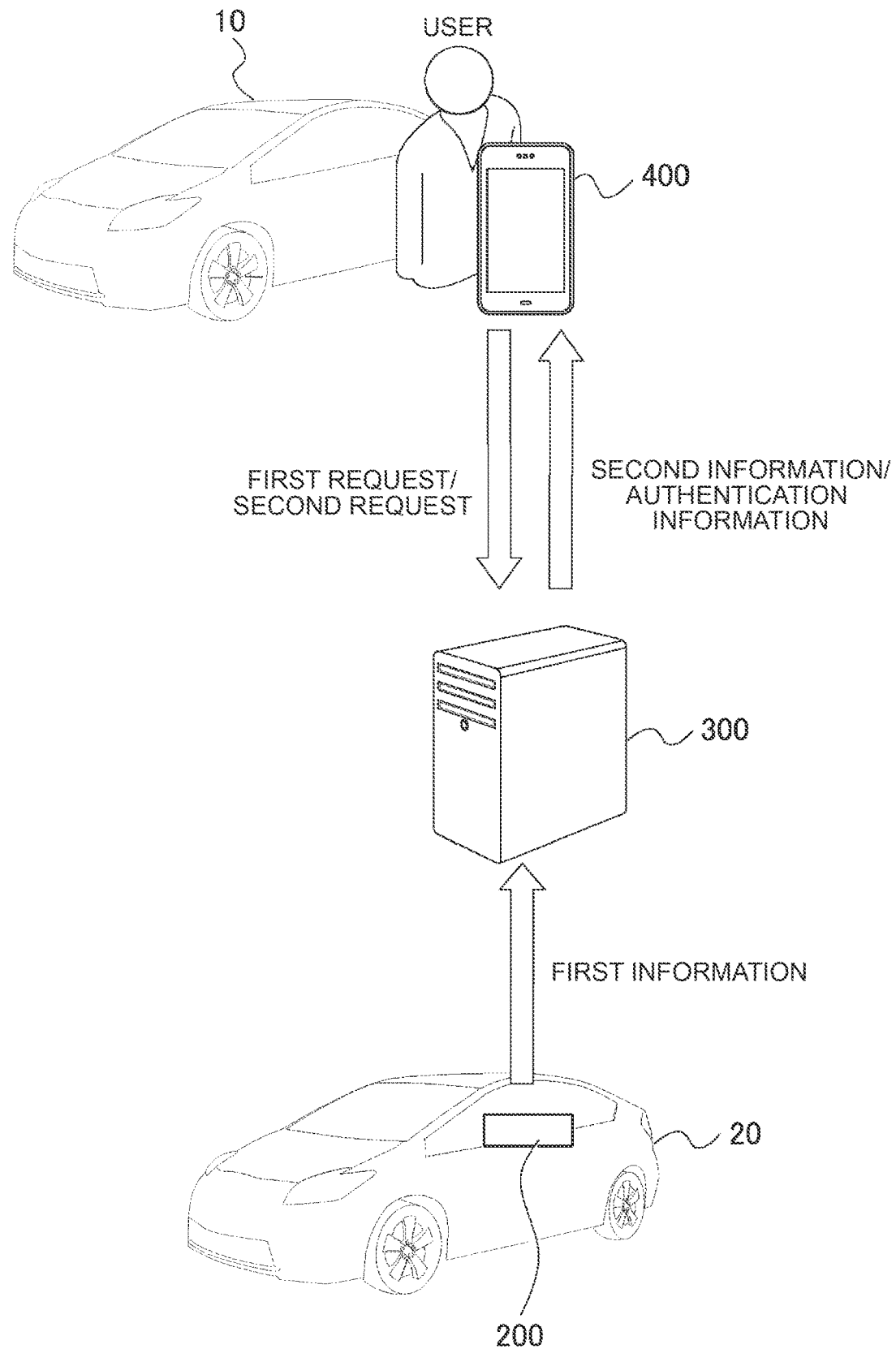
FIG. 1 is a diagram showing an overview of the system in the embodiment.

FIG. 1 is a diagram showing an overview of the system in this embodiment. The system in this embodiment includes a first vehicle 10, a second vehicle 20, a server 300, and a user terminal 400. The first vehicle 10, the second vehicle 20, and the server 300 are connected via a network. Although only one second vehicle 20 is illustrated in the example shown in FIG. 1, a plurality of second vehicles 20 is managed by the server 300.

The first vehicle 10 is a vehicle capable of charging a driving battery by power supply from the outside. The first vehicle 10 is, for example, a PHEV or BEV that runs using battery power as a drive source. The second vehicle 20 is a PHEV or BEV that runs using battery power as a drive source and has a function of supplying power to other vehicles. The second vehicle 20 in this embodiment is equipped with a camera 200 (for example, an omnidirectional camera) that captures an image of the surroundings of the second vehicle 20. In this embodiment, an example of using a company car as the second vehicle 20 will be described.

The user terminal 400 is a portable computer (e.g., smart phone, tablet terminal, etc.) used by the user of the first vehicle 10. The user terminal 400 in this embodiment is installed with a dedicated application program (hereinafter also referred to as "first application program") for providing car navigation services. Through execution of the first application program, the user terminal 400 receives input of a departure point and a destination by the user, and presents the user with a planned travel route from the departure point to the destination. The planned travel route is presented, for example, in the form of displaying the planned travel route on a map.

When the user terminal 400 of the present embodiment displays the planned travel route of the first vehicle 10 on the map, it also displays the location of the second vehicle parked around the planned travel route. For example, the user terminal 400 displays an icon indicating the second vehicle 20 at the parked location of the second vehicle 20. The user terminal 400 acquires information (second information) on the second vehicle 20 by sending a first request to the server 300 when the planned travel route of the first vehicle 10 is determined. The first request is a signal requesting the second information, and includes information regarding the planned travel route of the first vehicle 10.

The user terminal 400 of the present embodiment also has a function to receive a reservation from the user for charging the battery of the first vehicle 10 with the second vehicle 20, and a function to send a signal (second request) for requesting the received reservation to the server 300. The second request includes, for example, identification information (vehicle ID that will be described later) of the second vehicle 20 to be reserved.

The user terminal 400 in this embodiment also has a function of activating the power supply function of the second vehicle 20 using the authentication information provided by the server 300.

The server 300 of this embodiment has a function of generating second information and returning the generated second information to the user terminal 400 in response to the first request sent from the user terminal 400. The second information includes information on the parked location of the second vehicle 20 having a parking space around it. The server 300 determines whether there is a parking space around the second vehicle 20 based on image data captured by the camera 200 of the second vehicle 20. The remaining battery capacity of the second vehicle 20 is acquired by communication between the server 300 and the second vehicle 20.

When the server 300 of the present embodiment receives the second request sent from the user terminal 400, it receives a reservation to charge the battery of the first vehicle 10 with the second vehicle 20, and sends authentication information to the user terminal 400. The authentication information is information used to authenticate the user terminal 400 when the user terminal 400 is used to activate the power supply function of the second vehicle 20. For example, the user of the first vehicle 10 sends the authentication information and the activation command of the power supply function to the second vehicle 20 through the user terminal 400. In the second vehicle 20, the authentication information held by the second vehicle 20 and the authentication information received from the user terminal 400 are collated, and only when the collation is successful, the power supply function of the second vehicle 20 is activated. Note that the authentication information in this embodiment may be a one-time password that is valid only once.

In this embodiment, the user terminal 400 corresponds to the "first terminal" according to the present disclosure. Also, in the present embodiment, the server 300 corresponds to the "information processing device" according to the present disclosure.

Configuration of Server

Figure 2:
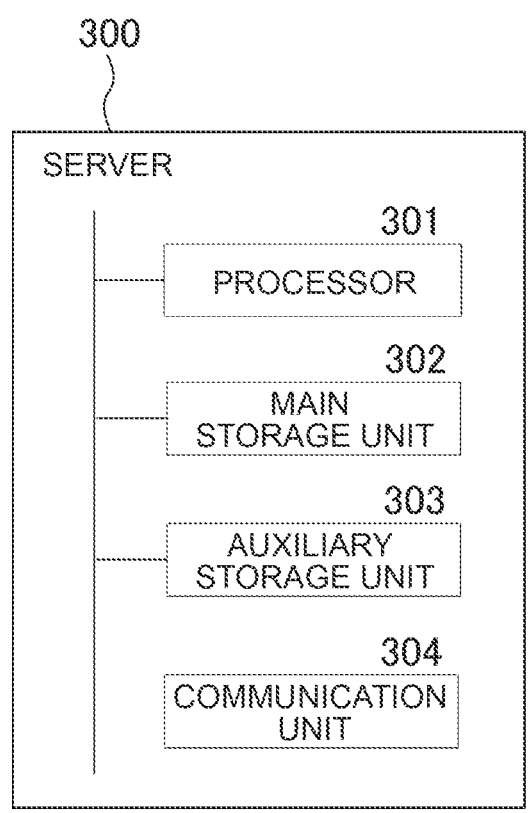
FIG. 2 is a diagram showing an example of the hardware configuration of a server in the embodiment.

FIG. 2 is a diagram showing an example of the hardware configuration of the server 300 in this embodiment. The server 300 in this embodiment includes a processor 301, a main storage unit 302, an auxiliary storage unit 303, and a communication unit 304, as shown in FIG. 2. In the example shown in FIG. 2, only the hardware configuration related to the service of providing information on vehicles having power supply functions is extracted and illustrated, but server 300 may include other hardware configurations.

The processor 301 is an arithmetic processing device such as a Central Processing Unit (CPU) or a Digital Signal Processor (DSP). The processor 301 loads a program stored in the auxiliary storage unit 303 into the main storage unit 302, executes it, and controls the server 300 through the execution.

The main storage unit 302 includes semiconductor memories such as Random Access Memory (DSP) and Read Only Memory (ROM), for example. The main storage unit 302 provides a storage area and work area for loading programs stored in the auxiliary storage unit 303. Further, the main storage unit 302 is used as a buffer for arithmetic processing by the processor 301.

The auxiliary storage unit 303 is, for example, Erasable Programmable ROM (EPROM) or Hard Disk Drive (HDD). The auxiliary storage unit 303 can include removable media, i.e., portable recording media. A removable medium is, for example, a disk recording medium such as a Universal Serial Bus (USB) memory, a Compact Disc (CD), or a Digital Versatile Disc (DVD). The auxiliary storage unit 303 stores various programs and data used by the processor 301 when executing each program.

The programs stored in the auxiliary storage unit 303 include, in addition to the Operating System (OS), a dedicated program for causing the processor 301 to execute processing related to a service that provides information on vehicles having a power supply function.

A communication unit 304 is an interface for connecting the server 300 to a network. The network is, for example, a Wide Area Network (WAN), which is a worldwide public communication network such as the Internet, or other communication network. Communication unit 304, for example, Long Term Evolution (LTE), LTE-Advanced, 5th Generation (5G), and 6th Generation (6G), such as mobile communication systems, Wi-Fi (registered trademark) and other wireless communication systems, or Local Area Network (LAN), etc., to connect to a network. In this embodiment, the communication unit 304 communicates with the first vehicle 10, the second vehicle 20, and the user terminal 400 through the network.

Server Functional Configuration

Figure 3:
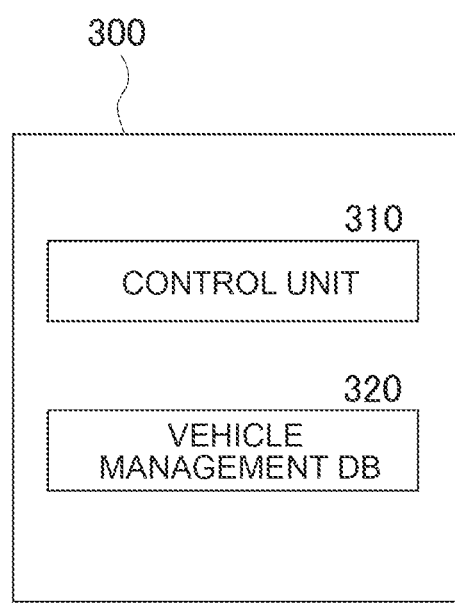
FIG. 3 is a block diagram showing an example of a functional configuration of a server in the embodiment.

A functional configuration of the server 300 in this embodiment will be described with reference to FIG. 3. FIG. 3 is a block diagram showing an example of the functional configuration of the server 300. As shown in FIG. 3, the server 300 in this embodiment has a control unit 310 and a vehicle management DB 320 as its functional components. Note that the functional components of the server 300 are not limited to the example shown in FIG. 3, and components may be omitted, replaced, or added as appropriate.

Of the control unit 310 and the vehicle management DB 320, the vehicle management DB 320 will be described first. Vehicle management DB 320 stores information on the second vehicle 20 managed by the server 300. The vehicle management DB 320 of this embodiment is a database constructed in the auxiliary storage unit 303 of the server 300 by the processor 301 of the server 300 executing a database management system (DBMS) program. At that time, the vehicle management DB 320 may be constructed as a relational database.

FIG. 4 is a diagram showing an example of information stored in the vehicle management DB 320 in this embodiment. The vehicle management DB 320 in this embodiment, as illustrated in FIG. 4, has a plurality of records (hereinafter also referred to as "vehicle information records") corresponding to each of the plurality of second vehicles 20 under the management of the server 300. Each vehicle information record has fields such as vehicle ID, appearance, status, location and reservation, as shown in FIG. 4. The configuration of the vehicle information record is not limited to the example shown in FIG. 4, and fields can be added, changed, or deleted as appropriate.

Information (vehicle ID) for identifying each of the plurality of second vehicles 20 under the control of server 300 by server 300 is registered in the vehicle ID field. In the appearance field, information indicating appearance features (for example, a character string of an automobile registration number mark, a vehicle type, a body color, etc.) for identifying an individual second vehicle 20 by a person other than the user of the second vehicle 20 (for example, a user of the first vehicle 10) is registered. Information indicating whether each second vehicle 20 is parked or traveling is registered in the status field. For example, for the second vehicle 20 that is parked, "parked" is registered in the status field. For the second vehicle 20 that is running, "running" is registered in the status field. Information indicating the current location of each second vehicle 20 is registered in the location field. For the second vehicle 20 having "parked" registered in the status field, the information (current location) registered in the location field is the information indicating the parked location. In the reservation field, information regarding whether or not there is a reservation for using each second vehicle 20 for battery charging of another vehicle is registered. For example, the reserved second vehicle 20 is registered as "yes" in the reservation field. "No" is registered in the reservation field for the second vehicle 20 that has not been reserved. Note that, in the present embodiment, the second vehicle 20 can be reserved on the condition that the second vehicle 20 is parked. Therefore, information indicating invalidity (N/A) is registered in the reservation field for the second vehicle 20 registered as "traveling" in the status field.

Information registered in the status field and the location field is periodically sent from the second vehicle 20 to the server 300 and updated.

Here, returning to FIG. 3, the control unit 310 of the server 300 will be described. The control unit 310 is implemented by processor 301 of server 300 loading a dedicated program stored in auxiliary storage unit 303 into main storage unit 302 and executing the program. Note that the control unit 310 may be realized by a hardware circuit such as an Application Specific Integrated Circuit (ASIC) or a Field Programmable Gate Array (FPGA).

The control unit 310 determines the second vehicle 20 that is the target of the second information, triggered by the reception of the first request by the communication unit 304. First, the control unit 310 accesses vehicle information records in the vehicle management DB 320 to determine whether each second vehicle 20 is available to reserve. In this embodiment, the control unit 310 determines that the corresponding second vehicle 20 is available to reserve when "parked" is registered in the status field of the vehicle information record and "no" is registered in the reservation field. On the other hand, when "traveling" is registered in the status field of the vehicle information record or "yes" is registered in the reservation field, the control unit 310 determines that the corresponding second vehicle 20 is not available to reserve. Reservation availability is determined for all vehicle information records registered in the vehicle management DB 320.

The control unit 310 excludes the second vehicle 20 that has been determined to be unavailable to reserve from the target of the second information. On the other hand, for the second vehicle 20 determined to be available to reserve, the control unit 310 calculates the distance (first distance L1) from the planned travel route of the first vehicle 10 to the parked location based on the information registered in the location field (current location (parked location) of the parked second vehicle 20) and the planned travel route of the first vehicle 10. The control unit 310 determines whether the calculated first distance L1 is within predetermined distance Lthre1. The predetermined distance Lthre1 is, for example, a distance (for example, several hundred meters to several kilometers) shorter than the distance that the first vehicle 10 can travel with the remaining battery power even when the remaining battery power of the first vehicle 10 has decreased to a predetermined threshold (e.g., the remaining battery capacity at which a warning prompting battery charging is output).

The control unit 310 excludes the second vehicle 20 for which the first distance L1 is determined to be greater than the predetermined distance Lthre1 from the objects of the second information. On the other hand, for the second vehicle 20 for which the first distance L1 is determined to be within the predetermined distance Lthre1, control unit 310 acquires first information. The first information is information including image data captured by the camera 200 of the second vehicle 20 and the remaining battery capacity of the second vehicle 20. When acquiring such first information, the control unit 310 sends a first command to the second vehicle 20 through communication unit 304. The first command is a signal including a command to activate the camera 200 to capture an image of the surroundings of the second vehicle 20, a command to acquire the remaining battery capacity of the second vehicle 20, and a command to return to the server 300 first information including the image data captured by the camera 200 and the acquired remaining battery capacity.

When the first information is sent from the second vehicle 20 to the server 300 in response to the first command, the first information is received by communication unit 304 of server 300. When the first information is received by the communication unit 304, the control unit 310 determines whether there is a parking space around the second vehicle 20 by executing image recognition processing on the image data included in the first information. Here, the "parking space around the second vehicle 20" is, for example, a parking space within reach of a power transmission cable used when power is supplied from the second vehicle 20 to another vehicle.

Note that when the parked location of the second vehicle 20 is within the first area, the control unit 310 may determine that there is a parking space around the second vehicle 20 without executing the image recognition process described above. Here, the "first area" is an area in which the parked location of the second vehicle 20 is determined in advance, such as a parking lot of a company that owns the second vehicle 20, which is a company car, and a parking space for the vehicle to be charged can be reserved in advance around the parked location.

The control unit 310 excludes the second vehicle 20 determined to have no parking space around it from the target of the second information. On the other hand, for second vehicle 20 determined to have a parking space around it, control unit 310 determines whether the remaining battery capacity included in the first information is equal to or larger than the predetermined threshold Bthre1. The predetermined threshold Bthre1 is the remaining battery capacity that is assumed to ensure the remaining battery capacity large enough not to hinder traveling even if the second vehicle 20 is used to charge the battery of other vehicle as long as the remaining battery capacity of the second vehicle 20 is equal to or larger than the predetermined threshold Bthre1.

The control unit 310 excludes the second vehicle 20 whose remaining battery capacity is less than the predetermined threshold Bthre1 from the second information targets. On the other hand, the control unit 310 determines that the second vehicle 20 whose remaining battery capacity is equal to or larger than the predetermined threshold Bthre1 is the target of the second information.

According to the above-described method, of the plurality of second vehicles 20 under the management of the server 300, the second vehicle 20 that is available to reserve (parked and not reserved), have the first distance L1 equal to or less than the predetermined distance Lthre1, have a parking space around it, and have a remaining battery capacity equal to or larger than the predetermined threshold Bthre1 are determined as objects of the second information.

When the second vehicle 20 that is the target of the second information is determined, the control unit 310 generates second information on the second vehicle 20. The second information is information including the vehicle ID and parked location of the second vehicle 20. The vehicle ID is information registered in the vehicle ID field of the vehicle information record corresponding to the second vehicle 20. The parked location is information registered in the location field of the vehicle information record corresponding to the second vehicle 20. The control unit 310 sends the generated second information to user terminal 400 through communication unit 304.

Upon receiving the second information, the user terminal 400 displays a map screen showing the planned travel route of the first vehicle 10 and the parked location of the second vehicle 20. When the user selects (for example, taps) a desired parked location of the second vehicle 20 on the map screen displayed on the user terminal 400, a signal (second request) requesting reservation of the second vehicle 20 corresponding to the selected parked location is sent from the user terminal 400 to the server 300. The second request at that time includes the vehicle ID of the corresponding second vehicle 20.

When the second request sent from the user terminal 400 is received by the communication unit 304 of the server 300, the control unit 310 receives the reservation of the corresponding second vehicle 20. Specifically, the control unit 310 accesses the vehicle management DB 320 using the vehicle ID included in the second request as an argument, and identifies a vehicle information record whose information registered in the vehicle ID field matches the vehicle ID included in the second request. The control unit 310 changes the information in the reservation field of the specified vehicle information record from "no" to "yes". Also, the control unit 310 sends authentication information (for example, a one-time password) to the user terminal 400 and the second vehicle 20 to be reserved. As a result, the user can charge the first vehicle 10 by the second vehicle 20 by sending the authentication information and the activation command of the power supply function to the second vehicle 20 through the user terminal 400. The second vehicle 20 compares the authentication information received from the user terminal 400 and the authentication information received from the server 300, and can activate the power supply function only when the comparison is successful. Therefore, the user of the first vehicle 10 can charge the battery of the first vehicle 10 using the second vehicle 20 without meeting the user of the second vehicle 20.

Processing Flow

Next, the flow of processing executed by the server 300 in this embodiment will be described with reference to FIG. 5. FIG. 5 is a flowchart showing a processing routine executed by the server 300 triggered by the reception of the first request by the communication unit 304 of the server 300. Although the entity that performs the routine of FIG. 5 is the processor 301 of the server 300, the functional component (control unit 310) of the server 300 is herein assumed to be the entity.

In the processing routine of FIG. 5, the first request is passed from the communication unit 304 to the control unit 310 when the communication unit 304 of the server 300 receives the first request. Thereby, the control unit 310 receives the first request through the communication unit 304 (S101). After completing the processing of S101, the control unit 310 executes the processing of S102.

It should be noted that the processing of S102 to S108 in FIG. 5 is executed for all vehicle information records registered in the vehicle management DB 320. First, in S102, the control unit 310 determines whether the second vehicle 20 corresponding to the vehicle information record is available to reserve based on the information registered in the target vehicle information record. That is, it is determined whether "parked" is registered in the status field of the target vehicle information record and "no" is registered in the reservation field. When "parked" is registered in the status field and "no" is registered in the reservation field (yes in S102), the control unit 310 executes the process of S103.

In S103, the control unit 310 calculates the first distance L1 (the distance from the planned traveling route of the first vehicle 10 to the parked location) based on the information (parked location) registered in the location field of the target vehicle information record and the planned traveling route of the first vehicle 10. The control unit 310 determines whether calculated first distance L1 is within predetermined distance Lthre1. When the first distance L1 is equal to or less than the predetermined distance Lthre1 (yes in S103), control unit 310 executes the process of S104.

In S104, the control unit 310 acquires the first information by communicating with the second vehicle 20 corresponding to the target vehicle information record. Specifically, the control unit 310 sends the first command to the second vehicle 20 through the communication unit 304. The first command is a signal including a command to activate the camera 200 to capture an image of the surroundings of the second vehicle 20, a command to acquire the remaining battery capacity of the second vehicle 20, and a command to return to the server 300 first information including the image data captured by the camera 200 and the acquired remaining battery capacity. When the second vehicle 20 sends the first information to the server 300 according to the first command, the control unit 310 acquires the first information through the communication unit 304. After executing the process of S104, the control unit 310 executes the process of S105.

In S105, the control unit 310 determines whether there is a parking space around the second vehicle 20 based on the image data included in the first information. When it is determined that there is a parking space around the second vehicle 20 (yes in S105), the control unit 310 executes the process of S106. When the parked location of the second vehicle 20 (the location registered in the location field of the target vehicle information record) is within the first area, the control unit 310 may determine that there is a parking space around the second vehicle 20 without executing the process of S104.

In S106, the control unit 310 determines whether the remaining battery capacity included in the first information is equal to or larger than the predetermined threshold Bthre1. When the remaining battery capacity is equal to or larger than the predetermined threshold Bthre1 (yes in S106), the control unit 310 executes the process of S107.

In S107, the control unit 310 determines the second vehicle 20 corresponding to the target vehicle information record as the target of the second information.

When no in any of S102 to S106, the control unit 310 executes the process of S108. In S108, the control unit 310 determines that the second vehicle 20 corresponding to the target vehicle information record is excluded from the second information.

After completing the processing of S107 or S108, the control unit 310 executes the processing of S109. In S109, the control unit 310 determines whether the processes of S102 to S108 have been completed for all vehicle information records registered in vehicle management DB 320. When S102 to S108 have not been completed for all the vehicle information records registered in the vehicle management DB 320 (no in S109), the control unit 310 performs the processing of S102 to S108 for the next target vehicle information record. Further, when the processes of S102 to S108 have been executed for all vehicle information records registered in the vehicle management DB 320 (yes in S109), the control unit 310 executes the process of S110.

At S110, the control unit 310 generates second information regarding the second vehicle 20 determined as the target of the second information at S107. The second information includes the vehicle ID and parked location of the corresponding second vehicle 20. Note that when there is a plurality of second vehicles 20 determined as targets of the second information, the control unit 310 generates the second information for each of the plurality of second vehicles 20. After completing the processing of S110, the control unit 310 executes the processing of S111.

In S111, the control unit 310 sends the second information generated in S110 to the user terminal 400 through the communication unit 304. After executing the process of S111, the control unit 310 executes the process of S112.

In S112, the control unit 310 determines whether the communication unit 304 has received the second request from the user terminal 400. The second request is a signal requesting reservation of battery charging of the first vehicle 10 by the second vehicle 20, and includes the vehicle ID of the second vehicle 20 desired by the user. When the communication unit 304 has not received the second request (no in S112), the control unit 310 waits to receive the second request. If the communication unit 304 does not receive the second request within a preset timeout period, the control unit 310 may terminate execution of this processing routine. On the other hand, when the communication unit 304 has received the second request (yes in S112), the control unit 310 executes the process of S113.

In S113, the control unit 310 accesses the vehicle management DB 320 using the vehicle ID included in the second request as an argument, and identifies a vehicle information record whose information registered in the vehicle ID field matches the vehicle ID included in the second request. The control unit 310 changes the information registered in the reservation field of the specified vehicle information record from "no" to "yes." In addition, the control unit 310 sends to the user terminal 400 and the second vehicle 20 authentication information that is required when charging the battery of the first vehicle 10 with the second vehicle 20. After completing the process of S113, the control unit 310 ends the execution of this process routine. When sending the authentication information to the user terminal 400, the control unit 310 may also send to the user terminal 400 information indicating the external features of the second vehicle 20 to be reserved. The information indicating the external features of the second vehicle 20 to be reserved is, for example, information registered in the appearance field of the vehicle information record corresponding to the second vehicle 20 to be reserved (character string of automobile registration number, vehicle type, body color, etc.). This allows the user of the first vehicle 10 to identify the second vehicle 20 even when other vehicles are parked around the second vehicle 20.

Actions and Effects of the Embodiment

According to the embodiment described above, of the second vehicles 20 that are available to reserve, the parked location of the second vehicle 20 whose first distance L1 is within the predetermined distance Lthre1, which has a parking space around it, and whose remaining battery capacity is equal to or larger than the predetermined threshold Bthre1 can be presented to the user of the first vehicle 10. As a result, the user of the first vehicle 10 can charge the battery of the first vehicle 10 by using the second vehicle 20 in a state where the battery of the first vehicle 10 can be charged more reliably. In addition, since the user of the first vehicle 10 can activate the power supply function of the second vehicle 20 using the authentication information provided by the server 300, there is no need to face the user of the second vehicle 20.

Therefore, according to the present embodiment, it is possible to improve convenience for the user who wants to charge the first vehicle 10.

Others

The above-described embodiment is merely an example, and the present disclosure can be modified as appropriate without departing from the scope of the present disclosure. Further, the processes described as being executed by one device may be shared and executed by a plurality of devices. Alternatively, the processes described as being executed by different devices may be executed by one device. In the computer system, it is possible to flexibly change the hardware configuration for implementing each function.

What is claimed is:

1. An information processing device comprising a control unit, the control unit being configured to
　receive a first request sent from a first terminal corresponding to a first vehicle, the first request being a request for information on a second vehicle having a power supply function,
　acquire a parked location of the second vehicle and first information on surroundings of the second vehicle, and
　send second information including the parked location to the first terminal when the control unit determines based on either or both of the parked location and the first information that there is a parking space around the second vehicle,
　wherein:
　　the first information further includes information on a remaining battery capacity of the second vehicle; and
　　the control unit is configured to send the second information to the first terminal when the control unit determines based on the first information that there is a parking space around the second vehicle and that the remaining battery capacity of the second vehicle is equal to or larger than a predetermined threshold.

2. The information processing device according to claim 1, wherein the control unit is configured to
　send a first command to the second vehicle, the first command being a command to capture an image of the surroundings of the second vehicle with a camera mounted on the second vehicle and return the first information including image data of the captured image, and
　determine whether there is a parking space around the second vehicle, based on the image data included in the first information returned from the second vehicle.

3. The information processing device according to claim 1, wherein the control unit is configured to determine that there is a parking space around the second vehicle when the parked location is within a first area.

4. The information processing device according to claim 1, wherein the control unit is configured to send authentication information to the first terminal when a reservation to charge the first vehicle with the second vehicle is received, the authentication information being information for activating the power supply function of the second vehicle.

* * * * *